United States Patent [19]
Uzgiris

[11] 3,732,014
[45] May 8, 1973

[54] ELECTROMAGNETIC RADIATION APPARATUS FOR ANALYZING SMALL PARTICLES

[75] Inventor: Egidijus Edward Uzgiris, Schenectady, N.Y.

[73] Assignee: General Electric Company

[22] Filed: Jan. 31, 1972

[21] Appl. No.: 222,150

[52] U.S. Cl. ............... 356/102, 356/103, 250/218, 356/107
[51] Int. Cl....G01n 15/02, G01n 21/00, G01n 21/26
[58] Field of Search.................356/102, 103, 104, 356/107; 250/218

[56] References Cited

UNITED STATES PATENTS

| | | | |
|---|---|---|---|
| 3,553,462 | 1/1971 | Johnson | 356/103 |
| 3,649,125 | 3/1972 | Lehmann | 356/104 |
| 3,539,262 | 11/1970 | Pryor | 356/107 |

Primary Examiner—Ronald L. Wibert
Assistant Examiner—Conrad Clark
Attorney—John F. Ahern et al.

[57] ABSTRACT

Method and apparatus for measuring static and dynamic properties of small particles are disclosed. A beam of energy is split into signal and reference beams. The signal beam is focused into a sample cell containing a solution or suspension of the particles to be analyzed, where it is scattered by interaction with the particles. Energy scattered at some angle is passed through restrictive apertures and a collecting lens to a detector. The reference beam is directed through an attenuator and a focusing lens to a fixed scattering matrix, which is located along the path of propagation of the scattered signal light. A portion of the scattered reference light is passed through a restrictive aperture to the detector where it is heterodyned with the scattered signal light.

15 Claims, 1 Drawing Figure

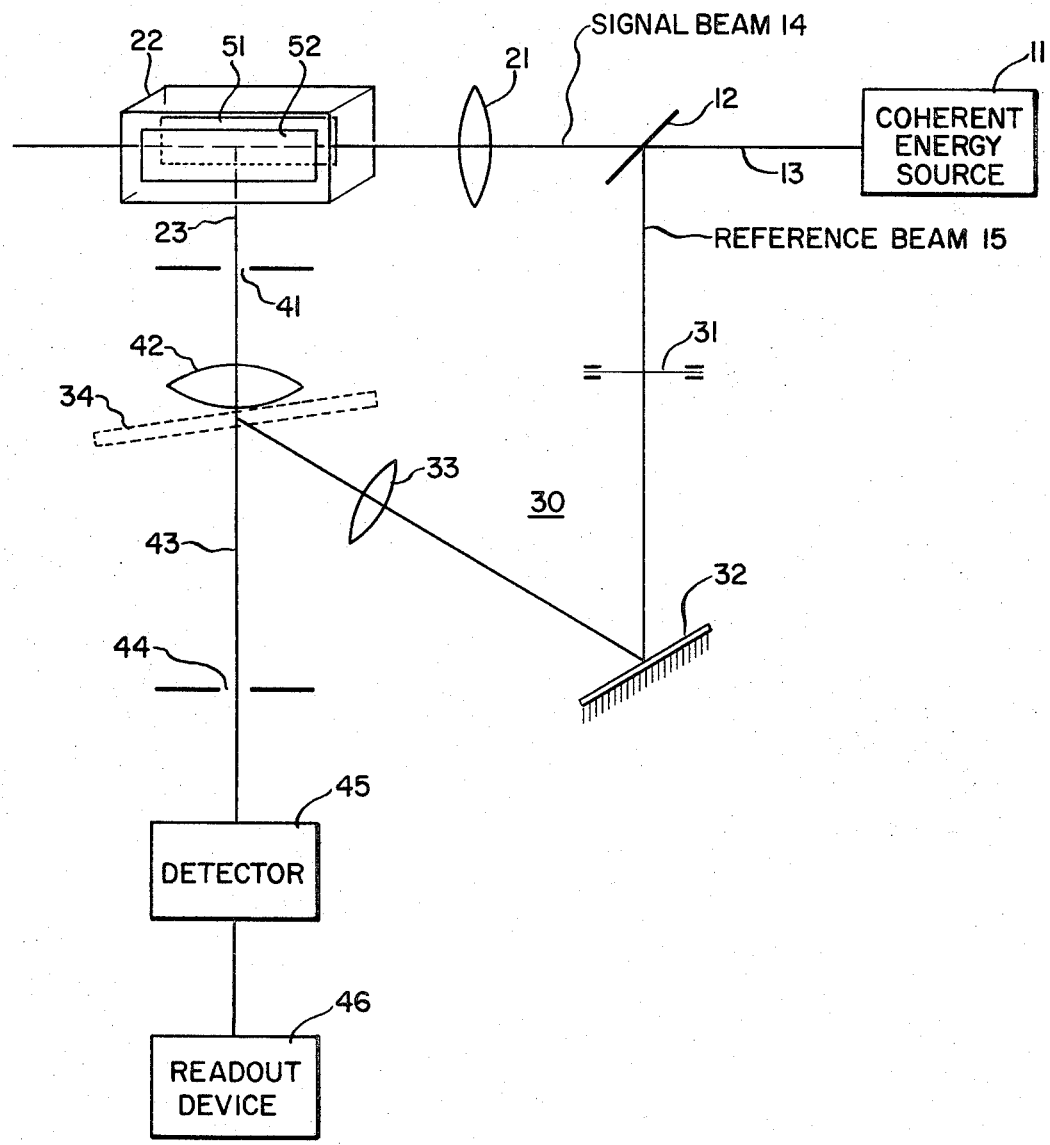

ELECTROMAGNETIC RADIATION APPARATUS FOR ANALYZING SMALL PARTICLES

This invention relates to the measurement of static and dynamic properties of small particles in solution or suspension. More particularly, the invention relates to the simultaneous measurement of such static and dynamic properties by a process of heterodyning signal energy, which has interacted with said particles, with reference energy.

This invention is related to the co-pending application of Bean, Ser. No. 81,824, filed Oct. 19, 1970, and assigned to assignee of this invention.

BACKGROUND OF THE INVENTION

It is frequently of value, in physical and biophysical investigations, to analyze energy scattered from liquids or suspensions. Examples of the utility of such analyses include the determination of size and electrophoretic mobility of biological macromolecules, which is of medical diagnostic value as well as being useful for biophysical research, and determination of thermal diffusion and critical point phenomena in liquids.

Presently known method and apparatus for analyzing small particles are most usually variants of one of two general types. In the first of these types, particles to be analyzed are included within an electrical circuit and the characteristics of the particles are determined from the effect of the presence of the particle upon the electrical parameters of the measuring circuit. An exemplar of this method is found in the application of Golibersuch, Ser. No. 81,825, filed Oct. 19, 1970, and assigned to assignee of the instant invention. Since this first general type is only peripherally related to the subject of the instant invention, it will not be discussed in further detail here. The second general type involves an analysis of energy scattered by the particles to be analyzed. The instant invention falls within this second general type. Included within the second general type are apparatus and methods employing either homodyne or heterodyne processes in the analysis of scattered energy. The aforementioned Bean application shows structural and functional similarities to the homodyne method, but may more accurately be considered an optical analog of the method employed by Golibersuch. Bean autocorrelates signal light scattered by particles electrophoretically traversing a beam of precisely known dimensions. A paper by H. Z. Cummins and H. L. Swinney entitled "Light Beating Spectroscopy" and appearing in *Progress in Optics*, Vol. 8, (1970) at pages 135 to 201, discusses both homodyne and heterodyne techniques, as presently employed.

In homodyne spectroscopy a beam of energy is focused into a sample cell containing a quantity of particles to be analyzed, where the energy is scattered by interaction with the contained particles. A portion of the scattered energy is collected and focused onto a detector. The autocorrelation function of the output of the detector is then computed. From the value of the autocorrelation function, certain characteristics of interest of the particles may be determined.

The homodyne method has the disadvantage that all but one of the properties potentially of interest to be measured must be known. For example, the analysis of a sample comprising a mixture of different sized particles will be very difficult, and even with particles with a single size it is not possible in a homodyne system to simultaneously measure the size and electrophoretic mobility of the particles. This effect results from the fact that the only detected energy is the signal energy collected from the moving scatterers under study.

By use of the heterodyne technique, on the other hand, more versatility in measurement capability is obtained. In heterodyning the detector receives not only the energy scattered by the particles to be measured, but also a beam of reference energy which provides for an independent comparison with the signal energy, thereby allowing the simultaneous determination of a plurality of particle parameters. As presently practiced, the heterodyne technique comprises two basic approaches. The first approach involves the use of an unscattered reference beam. This technique has the advantages of providing for independent control of the reference energy amplitude, but has the disadvantage of requiring a very meticulous angular alignment of the reference beam in order to achieve good signal-to-noise ratio. A slight misalignment will cause a drastic increase in shot noise because of the decrease in the heterodyne mixing efficiency. The second approach involves scattering of a portion of the signal energy from a fixed scatterer located within or on a wall of, the sample cell in order to provide the reference energy. This technique eliminates the need for critical angular alignment of the reference beam, at the cost of loss of independent control of the reference energy amplitude, a restriction to the use of small scattering angles, and a high level of susceptibility to microphonic noise.

Accordingly, it is an object of this invention to provide method and apparatus for measuring static and dynamic properties of small particles in solution or suspension, in which signal energy is scattered from such particles and is combined with independently scattered reference energy.

It is another object of this invention to provide such method and apparatus which utilizes heterodyning of the signal and reference energy and provides increased sensitivity over the homodyne technique and other, presently known, heterodyne techniques.

A further object is to provide such a system in which the signal energy and reference energy are completely decoupled.

Another object is to provide for independent control of reference energy amplitude.

Yet another object is to provide a system which eliminates criticality in angular alignment of the reference beam.

A further object of this invention is to provide method and apparatus for simultaneously measuring both static and dynamic properties of small particles.

It is also an object of this invention to provide for the detectability of uniform motion, for example, electrophoretic motion, simultaneously with Brownian motion.

Another object is to provide such a system which is useful in the analysis of mixtures of particles having different characteristics.

Another object is to provide apparatus for such measurements which is simple and inexpensive to manufacture and microphonically insensitive.

Another object is to provide a system which is useful for the measurement of properties of biological macromolecules and the study of critical point phenomena in liquids.

Briefly, this invention is a method for analyzing properties of small particles in solution or suspension in which a beam of energy is split into a signal beam and a separate reference beam. The signal beam is focused into a sample cell containing the solution or suspension under study and is scattered by interaction with the particles therein. The reference beam is directed through an attenuator for controlling reference energy amplitude independently of signal energy amplitude, and is then directed by beam steering and focusing means onto a fixed scattering matrix. A portion of the scattered signal energy and a portion of the scattered reference energy are simultaneously incident upon an appropriate square law detector and are mixed therein. The heterodyne output of the detector is received by appropriate analytical and readout means, which may comprise, for example, a spectrum analyzer or a computer, from whose output may be determined the characteristics of interest of the particles. The invention is embodied in apparatus in which the source of energy is preferably a helium-neon laser whose output is split by a beam splitter into the signal and reference beams. The signal beam is focused by a lens into a light transmissive, fluid impermeable, sample cell for containing the liquid or suspension to be studied. The sample cell also contains electrodes for imparting electrophoretic motion to the particles to be analyzed. Light scattered from the particles at a selected angle is passed through a restrictive aperture and a collecting lens. Immediately following the collecting lens along the optical path of the scattered signal light is a fixed plane scattering matrix. The reference beam proceeds from the beam splitter through an attenuator and steering and focusing means to the fixed scattering matrix. The scattered signal energy and scattered reference energy then proceed through a restrictive aperture to the square law detector where they are heterodyned.

In the drawing, the single FIGURE is a diagrammatic illustration of apparatus constituting the preferred embodiment of this invention. Energy source 11, which may be any convenient source of coherent energy, but is preferably a laser, as for example, a helium-neon laser, produces a beam of energy 13 which is split by beam splitter 12 into a signal beam 14 and a reference beam 15. Signal beam 14 is focused by focusing lens 21 into sample cell 22. Sample cell 22 contains a fluid in which is dissolved or suspended the particles to be analyzed. A portion of the energy in beam 14 is scattered by interaction with the particles to be analyzed. That portion of the energy of signal beam 14 which is scattered in cell 22 constitutes the scattered signal beam 23 which is to be analyzed to determine the parameters of interest of the particles. The scattering angle is selected to facilitate the measurement of the parameters of interest. It is a feature of this invention that energy scattered at any angle may be analyzed, and therefore the angle may be selected by the user of the apparatus to provide for the collection of the best data on whichever parameters are most of interest in his investigation. For example, electrophoretic motion is best studied at shallow scattering angles, diffusion is best studied at steep angles, and the scattering angle used is relatively immaterial in the determination of particle size. The drawing illustrates a 90° scattering angle which would be appropriate for thermal diffusion studies, for example. Scattered signal beam 23 passes through restrictive aperture 41, collecting lens 42, fixed scattering matrix 34, and restrictive aperture 44 to detector 45 which is preferably a photomultiplier tube but may be any appropriate square law detector. The function of apertures 41 and 44 and collecting lens 42 is to focus scattered signal beam 23 onto the active surface of detector 45. Fixed scattering matrix 34 has no operational effect upon scattered signal energy 23. In traversing matrix 34, signal energy 23 undergoes some slight forward scattering. Since, however, the degree of such forward scattering is negligible in relation to the scattering occurring in sample cell 22, and since the weak forward scattering which does occur is constant as a function of time, there is no detectable effect upon measurement results produced by the forward scattering of signal light 23 at matrix 34.

Reference beam 15 proceeds from beam splitter 12 through reference beam processing means indicated generally at 30 to fixed scattering matrix 34. The angle of incidence of the reference beam upon fixed scattering matrix 34 is selected to maximize the scattering of the reference beam along path 43 toward detector 45; angular alignment of the reference beam steering means and the fixed scattering matrix however, is not critical since an alignment within several degrees of latitude provides essentially equivalent results, and even greater latitudes still provide experimentally highly acceptable results. In the preferred embodiment, fixed scattering matrix 34 comprises a layer of 910 Angstrom polystyrene spheres on one surface of a glass slide. Satisfactory results have been obtained experimentally using scatterers of diameters between 900 and 4000 A. The function of fixed scattering matrix 34 is to scatter the reference energy. Scattered reference energy proceeds along path 43, together with scattered signal energy, through restrictive aperture 44 to detector 45. At detector 45 heterodyne mixing of the scattered signal energy with the scattered reference energy occurs. The output of detector 45 is an electrical signal which is provided to processing and readout means 46. Means 46 may be a spectrum analyzer, computer, or other appropriate output device. In electrophoresis measurements, for example, a spectrum analyzer is the more convenient readout means since the contributions of the elements of a polydisperse suspension are more easily distinguished in the frequency domain than in the time domain. On the other hand, for thermal diffusion measurements, for example, an autocorrelation function computer is the more convenient readout means. Reference beam steering and processing means 30 comprise attenuator 31, mirror 32, and focusing lens 33. The function of attenuator 31 is to provide for control of the amplitude of the reference energy independently of the amplitude of the signal energy. In the preferred embodiment, attenuator 31 may be any variable density light filter as are known in the art, such as Variable Beam Splitter-Attenuator Model VBA-200, manufactured by Jodon Engineering Associates, Inc., but preferably also includes a totally opaque portion. Alternatively, a series of fixed attenuators, such as Wratten neutral density filters manufactured by Eastman Kodak Company may be used. The use of fixed attenuators decreases the convenience of operation of the apparatus, but also decreases its cost. Since, in typical measurement procedures, the reference energy amplitude is significantly larger than the signal energy amplitude, the ability to attenuate the reference energy is useful for avoiding overload of the detector and the electronic circuitry following the detector, thereby allowing the measurement system sensitivity to be maximized.

A totally opaque portion of attenuator 31 is useful for determining the mixing efficiency of detector 45. Mixing efficiency is determined by comparing the output of detector 45 in the absence of reference energy with the output of detector 45 with reference energy present. Knowledge of the mixing efficiency of the system for a given experiment is useful in determining certain parameters of the sample under study which may be of interest. After passing through attenuator 31, reference beam 15 is reflected from mirror 32 at an appropriate angle as already discussed toward fixed scattering matrix 34.

The function of focusing lens 33 is to focus the reference energy onto a very small spot area on fixed scattering matrix 34. This is necessary since the reference scattering spot must be near the optical line between the scattering volume of sample cell 22 and the acceptance aperture of detector 45 and the optical paths of the scattered signal energy and the scattered reference energy must coincide as shown at 43. With the reference beam focused to a small spot by focusing lens 33, the required coincidence is obtained by the following procedure: with a large collecting aperture 44, fixed scattering matrix 34 is adjusted in lateral position so as to maximize the photocurrent fluctuation amplitude relative to shot noise in the output of detector 45. Collecting aperture 44 is then reduced in size and matrix 34 is further laterally adjusted to further maximize the signal-to-noise ratio. The limits of accuracy required for the lateral adjustment of fixed scattering matrix 34 is between 100 and 200 microns which can be achieved by hand adjustments. This is the most critical alignment in the inventive system and therefore it may be seen that the alignment problems inherent in prior art heterodyne spectroscopy have been obviated by this invention. Furthermore, this invention has been experimentally demonstrated to increase measurement sensitivity by a factor of four over that obtainable with homodyne techniques.

Sample cell 22 contains electrodes 51 and 52 for imparting electrophoretic motion to the particles under study. Electrophoresis is well known in the art and will not be described in detail here beyond indicating that electrodes 51 and 52 are preferably those described by Bean in his application cited supra. By use of the inventive method and apparatus, it is simple to measure small uniform motion of scatterers, such as electrophoretic motion, while such scatterers are also undergoing Brownian motion. While in homodyne methods, information on uniform motion is lost, with the inventive method and apparatus uniform motion produces a doppler frequency shift which modulates the exponential decay of the photocurrent autocorrelation and is therefore measureable. Moreover, because cross terms between the reference and signal energy fields can be made dominant, the photocurrent autocorrelation depends on the scattered electric field autocorrelation function. Thus, if the scattered signal field is produced by different sized scatterers undergoing differing diffusive motions, the resulting photocurrent autocorrelation will be the sum of the contributions of each specie of particle. Therefore the inventive method and apparatus enables the analysis of diffusive motion of simple polydisperse suspensions.

Obviously, other modifications and variations of the present invention are possible in view of the above teachings. It should therefore be understood that within the scope of the appended claims the invention may be practiced otherwise than is specifically described.

The invention claimed is:

1. Apparatus for measuring static and dynamic characteristics of small particles comprising:
   a. a source of energy for producing a first beam of energy;
   b. beam splitting means interposed along the path of propagation of said first beam of energy for splitting said first beam of energy into second and third beams of energy;
   c. a sample cell for containing a quantity of said particles, said sample cell being interposed along the path of propagation of said second beam of energy, so that a portion of said second beam of energy is scattered by said particles;
   d. a fixed scattering matrix;
   e. means for directing said third beam of energy onto said fixed scattering matrix; and
   f. energy detector means for receiving energy scattered by said particles and energy scattered by said fixed scattering matrix, said energy detector means providing an output signal indicative of said static and dynamic characteristics.

2. The apparatus of claim 1 wherein said means for directing said third beam includes a reflecting surface and a focusing lens, said third beam being focused into a small spot on said fixed scattering matrix.

3. The apparatus of claim 2 wherein said reflecting surface and said fixed scattering matrix are so positioned as to maximize the scattering of said third beam.

4. The apparatus of claim 2 including additionally attenuator means interposed along the path of propagation of said third beam between said beam splitting means and said focusing lens for controlling the amplitude of said third beam.

5. Apparatus as claimed in claim 1 wherein said energy detector means is adjustable in position so as to receive energy scattered in said sample cell at a preselected angle to the path of propagation of said second beam, said preselected angle being determined by said characteristics.

6. The apparatus of claim 5 including additionally energy collimating means interposed between said sample cell and said energy detector means.

7. The apparatus of claim 6 wherein said energy collimating means comprises:
   a. a first restrictive aperture for admitting energy scattered at said preselected angle in said sample cell;
   b. a collecting lens for receiving energy admitted by said first restrictive aperture and focusing said energy onto said energy detector means; and
   c. a second restrictive aperture for controlling energy admitted to said energy detector means.

8. The apparatus of claim 6 wherein said fixed scattering matrix is interposed within said energy collimating means.

9. The apparatus of claim 7 wherein said first restrictive aperture is disposed immediately adjacent a first active surface of said collecting lens and said fixed scattering matrix is disposed immediately adjacent a second active surface of said collecting lens, and divergence between said energy scattered by said particles and said energy scattered by said fixed scattering matrix is minimized.

10. The apparatus of claim 1 wherein said energy detector means is a square law detector and said output signal is the detected heterodyne product of said energy scattered by said particles and said energy scattered by said fixed scattering matrix.

11. The apparatus of claim 1 wherein said energy source is a helium-neon laser and said first, second, and third beams of energy are light.

12. The apparatus of claim 1 including additionally means within said sample cell for imparting electrophoretic motion to said particles.

13. The apparatus of claim 12 wherein said means for imparting electrophoretic motion comprises a pair of substantially parallel electrically conducting plates.

14. The apparatus of claim 1 wherein said fixed scattering matrix comprises a layer of substantially spherical particles of dimension of approximately 900 A. to 4000 A. in diameter.

15. The method of measuring static and dynamic characteristics of small particles comprising the steps of:
 a. splitting a beam of energy into a signal beam and a reference beam;
 b. focusing said signal beam into a quantity of said particles, said signal beam being scattered by said particles;
 c. focusing said reference beam onto a fixed scattering matrix;
 d. mixing, in a square law detector, energy scattered by said particles with energy scattered by said fixed scattering matrix; and
 e. computing the autocorrelation function of the output of said square law detector.

* * * * *

UNITED STATES PATENT OFFICE
CERTIFICATE OF CORRECTION

Patent No. 3,732,014　　　　　　Dated May 8, 1973

Inventor(s) Egidijus E. Uzgiris

It is certified that error appears in the above-identified patent and that said Letters Patent are hereby corrected as shown below:

On the first page at Item [54] and at Column 1, lines 1 and 2, the title of the invention is corrected to read:

ELECTROMAGNETIC RADIATION METHOD AND APPARATUS FOR ANALYZING SMALL PARTICLES

Signed and sealed this 10th day of September 1974.

(SEAL)
Attest:

McCOY M. GIBSON, JR.　　　　　　C. MARSHALL DANN
Attesting Officer　　　　　　　　Commissioner of Patents